April 28, 1964 R. T. COFFEY 3,130,907
MEANS FOR PREVENTING ROTATION OF PENDULOUS
ELEMENT OF HUB ODOMETER
Filed Sept. 10, 1959 2 Sheets-Sheet 1
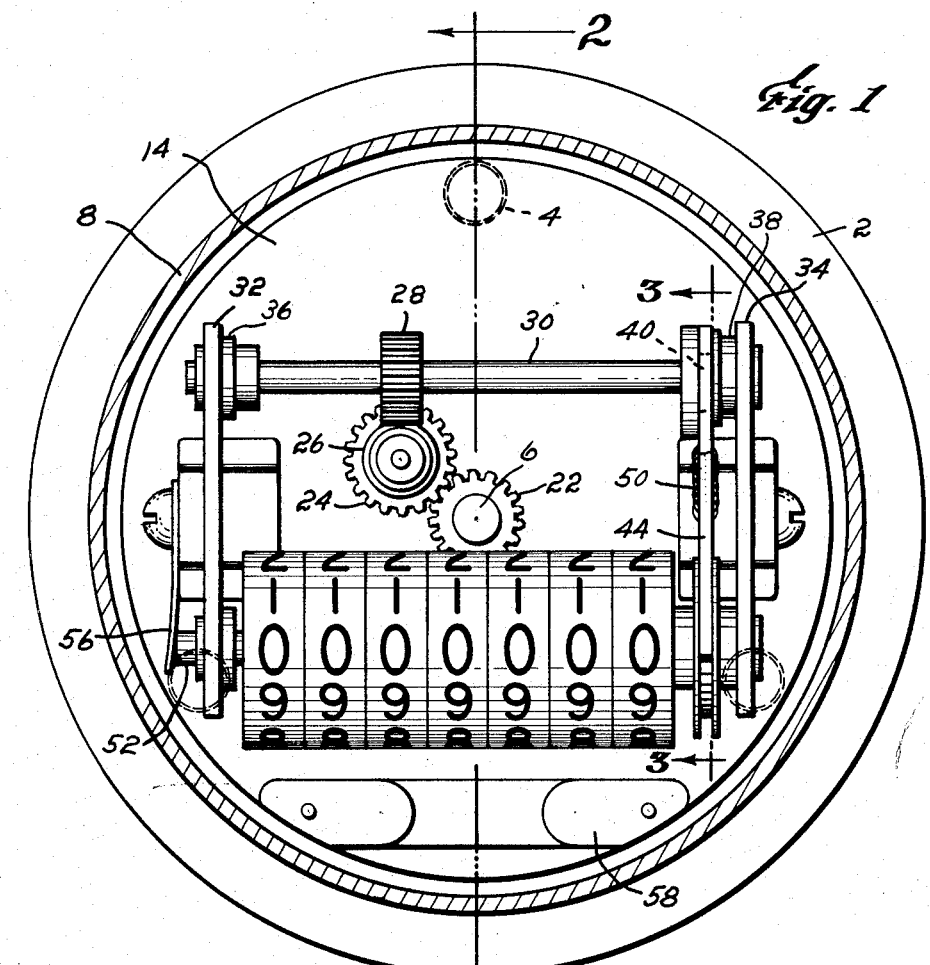
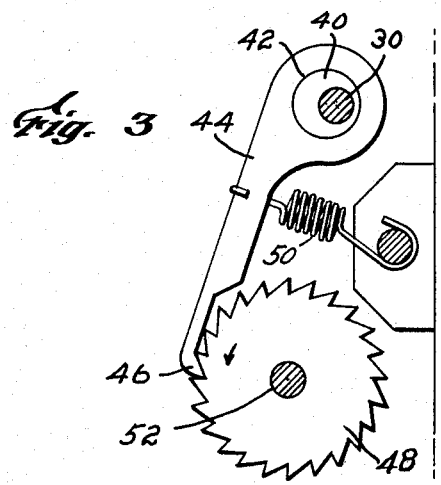
Roger T. Coffey
Inventor
by Porter, Chittick & Russell
Attorneys April 28, 1964  R. T. COFFEY  3,130,907
MEANS FOR PREVENTING ROTATION OF PENDULOUS
ELEMENT OF HUB ODOMETER
Filed Sept. 10, 1959  2 Sheets-Sheet 2

Roger T. Coffey
Inventor
by Porter, Chittick & Russell
Attorneys

United States Patent Office 3,130,907
Patented Apr. 28, 1964

3,130,907
MEANS FOR PREVENTING ROTATION OF PENDULOUS ELEMENT OF HUB ODOMETER
Roger T. Coffey, 31 Charlesbank Road, Newton, Mass.
Filed Sept. 10, 1959, Ser. No. 839,189
5 Claims. (Cl. 235—95)

This invention relates to hub odometers and is particularly concerned with the provision of new and novel means for preventing the undesired rotation of the odometer about its supporting shaft or for stopping such rotation promptly after it has commenced.

Odometers are commonly used by operators of truck and bus fleets to determine the mileage each vehicle has covered. It is not always possible to utilize the standard flexible shaft driven combination odometer and speedometer and therefore the so-called hub odometers have come into extensive use. The mileage information obtained by the odometer is used in keeping maintenance records, determining lease charges on equipment and tires, and keeping other necessary records related to the distance the vehicle has traveled. Accuracy within a small percentage is obviously necessary.

The hub odometer with which the present invention is used is mounted on the wheel in alignment with the axle but there is no mechanical connection between the wheel axle and the odometer. In this type of odometer, only the cylindrical case and the central supporting shaft rotate with the wheel. The frame of the instrument positioned within the case is suspended on the shaft by means of low friction bearings and is maintained on the shaft in non-rotating condition by being weighted in such manner that it acts as a pendulum. Thus the frame which carries the counting mechanism normally hangs on a shaft with its center of gravity directly below the axis of the shaft. The pendulosity is sufficient to overcome any friction torque acting on the frame due to the rotation of the shaft in the bearings or due to the working of the counting mechanism which is actuated by the relative rotation of the shaft which coacts with the counting mechanism on the stationary pendulous frame.

A pendulum type odometer requires no connection with the axle whether the latter be rotating or stationary. It merely has to be mounted on the wheel, which is easy of accomplishment. Furthermore, since no driving mechanism projects outside the odometer case, the case can be sealed against the ingress of all foreign material.

The pendulum type odometer of the prior art, however, has one basic defect which becomes a factor if a vehicle travels over anything but a perfectly smooth road. On any average road, the center of the wheel bounces up and down as road irregularities are encountered. These disturbances start the pendulous element swinging and any displacement acting to move the center of gravity causes a force to act through the center of gravity of the pendulous element and in the direction of the displacement. This force acting through the center of gravity of the pendulous element when it is not directly below the shaft or axis of suspension causes a torque about the axis of suspension which can be large enough to cause the pendulous element to rotate about the axis of suspension. Once the element has started to rotate, the bearing friction at the shaft is enough to keep it going and it will continue to rotate with the wheel until the wheel comes to a stop long enough for the friction to dissipate the rotational energy in the element or until a fortuitous bounce of the wheel causes an opposing torque of the proper value to stop the rotation. It is not uncommon for a single bounce of the wheel to start the element of prior art devices rotating, with the rotation continuing thereafter for many miles of driving. Instances of rotation for fifty to a hundred miles are not uncommon. When the element is rotating with the shaft instead of hanging vertically as it should, there is no relative rotation between the case and the pendulous element, and as a result there is no recording on the counter of the mileage covered by the vehicle during this period. Tests have shown that pendulum type odometers of the prior art show mileage deficiencies in the order of five to seven percent.

By the construction that will hereinafter be described in detail, the tendency of the pendulous element to rotate about its supporting axis is substantially overcome. This result is accomplished by providing means for reducing the initial amount of rotational energy fed into the element and by having the same means act to dissipate the energy once it is fed in.

The means used for carrying out the invention contemplates one or more particles located in a normally non-rotating circular container of such radius that should the container rotate at the speed of the wheel and carry with it, momentarily at least, the one or more particles the centrifugal force applicable to the particle or particles will be insufficient to cause the particle or particles to rotate continuously with the container. Instead, each particle as it approaches the top of the circular path will always break away from the circular path and under the influence of gravity fall downwardly within the container to re-engage the wall of the container in a manner to apply a restraining force against further rotation. Thus, even though the container and particle or particles may be momentarily put into rotation, the container's rotation will immediately be stopped by the above referred to behavior of the particle or particles.

The invention will be more particularly understood by the following description when considered with the accompanying drawings in which FIG. 1 taken on the line 1—1 of FIG. 2 is a front view of the odometer with the protective casing removed therefrom.

FIG. 3 is a vertical section taken on the line 3—3 of FIG. 1.

Figure 2:
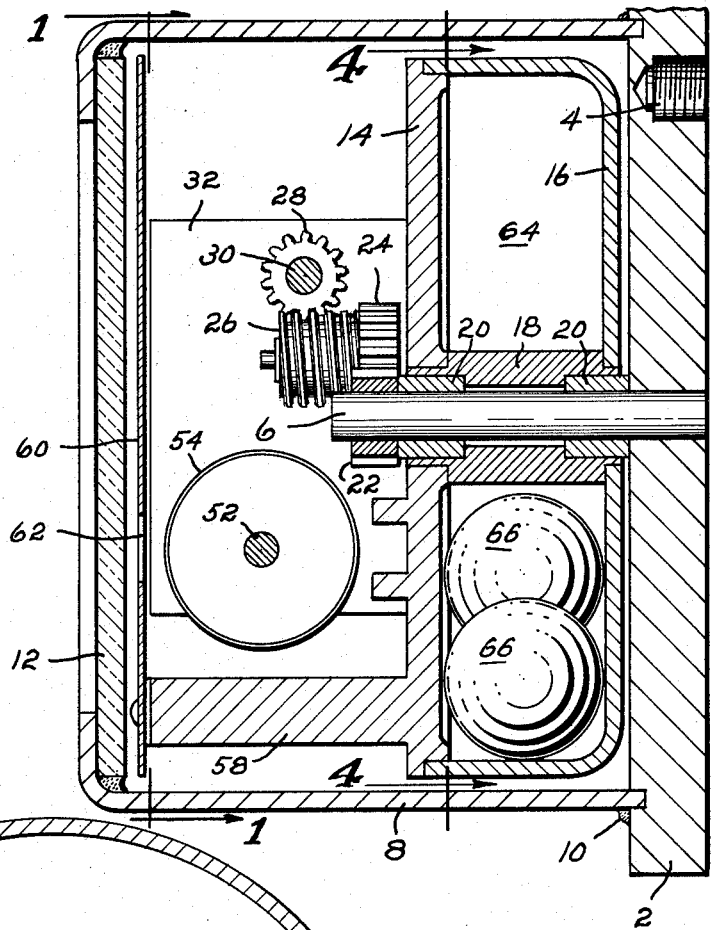
FIG. 2 is a vertical section of the complete unit taken approximately on the line 2—2 of FIG. 1 with the protective casing in position.

Referring now particularly to the drawings, the odometer is carried by a base plate 2 which is affixed to the vehicle wheel in any convenient manner as by attaching suitable brackets to the three tapped holes 4. The base plate carries in fixed relation a supporting shaft which extends outwardly in alignment with the wheel axle and along the axis of a protective case 8, which case is cylindrical and is soldered to the base plate 2 as at 10 about its periphery. The outer end of the case is closed by a glass 12 which is hermetically sealed in position in any suitable manner. By this construction, it is obvious that nothing can enter the case to affect the mechanism contained therein.

The frame which supports the instruments comprises a circular plate 14 which cooperates with a dished cover 16 to form an annular space about the shaft 6. A tubular element 18 extends between plate 14 and the cover 16 and carries bearings 20 which in turn engage shaft 6.

Fixed on the end of shaft 6 is a gear 22 that meshes with another gear 24 rotatably mounted on a stud on the base plate 14. Affixed to gear 24 is a worm 26 which cooperates with a worm wheel 28 fixed on shaft 30.

Plate 14 carries a pair of spaced side plates 32 and 34 which serve to support bearings 36 and 38 in which reside the ends of shaft 30. On the righthand end of shaft 30 as viewed in FIG. 1 and as shown in FIG. 3 is an eccentric 40 positioned within a suitable corresponding opening 42 in the upper end of lever 44. On the lower end of lever 44 is a pawl 46 which cooperates with ratchet wheel 48 to turn the wheel tooth by tooth counterclockwise as shaft 30 rotates. Rotation of shaft 30 may be in either direction. A spring 50 continually urges pawl 46 against the ratchet wheel 48.

Ratchet wheel 48 is mounted on a shaft 52, the end of which is carried by the side plates 32 and 34. This shaft carries the seven-figure counter 54, which is a well known construction and need not be described here. The left end of shaft 52 as viewed in FIG. 1 is engaged by a leaf spring 56 which acts to prevent the ratchet wheel 48 from turning backward as the pawl 46 retreats to the next tooth.

Affixed to the lower portion of plate 14 is a relatively heavy weighted portion 58 which together with all of the other structures causes all of the elements heretofore described that are mounted on shaft 6 to act as a pendulum, thereby causing the structure to hang motionless within the case 8 when the base plate 2, case 8 and shaft 6 are caused to rotate by the rotation of the wheel to which the unit is affixed. With the circumference of the wheel known, proper gear ratios may be applied to the gearing so that the distance traveled by the wheel will read directly in miles on the counter 54.

To give somewhat further protection to the gearing, counter and other parts in the event glass 12 should be broken, a vertical circular plate 60 is attached to the end of weight 58 but clear of engagement with the interior of case 8. An opening 62 is provided directly in front of the numbers on the counter 54 so that the mileage may be readily observed.

The assembly carried by shaft 6 and positioned within case 8 thus far described is pendulous, and the mechanism normally hangs with the counter center line horizontal and below the axis of shaft 6, and there is no significant difference between this construction and other units of the pendulous type found in the prior art. The construction that constitutes the differences of the present invention over the prior art will now be pointed out.

The annular space 64 within the confines of plate 14 and cup 16 is partially filled with loose particles 66 which in the preferred form will be ball bearings whose surfaces are reasonably smooth. Furthermore the ball bearings will be of such diameter as to comfortably fill the space between plate 14 and the back of cup 16. The space in the enclosure will be approximately half filled with the selected particles. These, of course, add to the pendulosity of the unit when it is in normal operating position with the axis of shaft 6 horizontal. Any sudden displacement vertically upward of the unit acts to maintain the pendulous element in the correct attitude. Any sudden displacement vertically downward causes the case to move downward away from the particles 66, which are subject only to gravity, leaving the particles suspended in space until the top part of the annular case strikes the particles, scattering them in a random manner within the confines of the annular space. If no rotational component has been imparted to the pendulous element by the sudden downward movement, the particles will settle to the bottom of the annular space. If, however, the pendulous element starts to rotate, the loose particles rub against the smooth inner surface of the annular space and the friction of this relative motion dissipates the rotational energy in the system. Proper selection of the quantity, size and surface finish of the loose particles and of the finish of the walls of the annular space result in sufficient damping to bring the pendulous element to rest from any rotational speed up to approximately sixty miles an hour when used on any typical bus, truck or trailer wheel.

Further examination of the behavior of the particles when in the form of steel ball bearings as shown in the drawings shows that as the annular case is displaced angularly the balls move in part to that side of the casing that is moving upwardly to develop a moment arm which resists turning and thus helps to prevent the initial development of rotation of the counter mechanism.

The size, quantity and shape of the particles for best results can only be determined empirically, but it is to be understood that the construction defined in the claims is intended to include all damping arrangements made according to this principle when used in connection with the damping of a pendulum type odometer.

Figure 4:
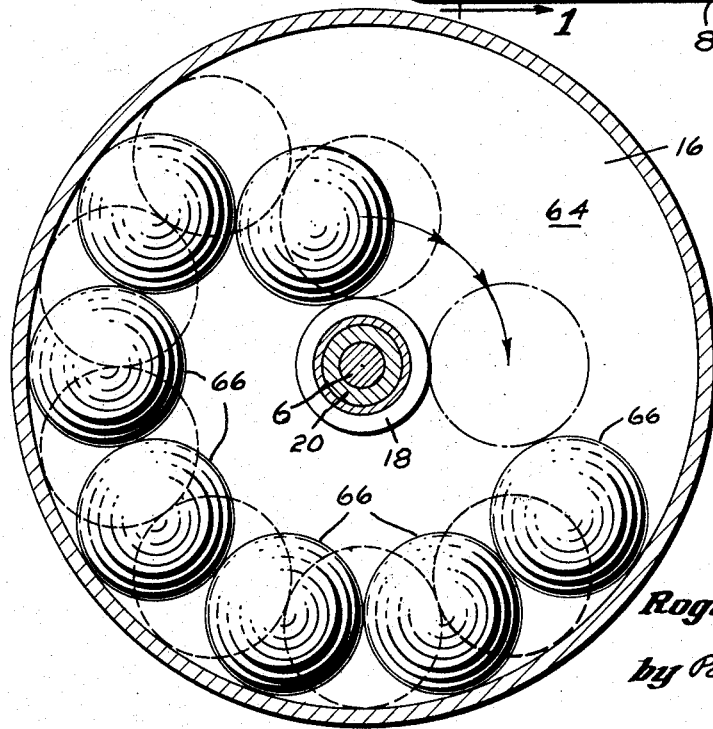
FIG. 4 is a vertical section taken on the line 4—4 of FIG. 2.

As shown in FIG. 4, one preferred arrangement of balls has them of such diameter that the uppermost balls on the left when the ball enclosure is rotated clockwise fall to the right passing over sleeve 18. At all times there will be a moment arm equal to the distance of the center of gravity of the three topmost balls from the center line of the shaft 6 with a downward force acting frictionally against the enclosure walls to resist the clockwise turning tendency. When the element resumes normal position, the balls likewise resume a balanced position.

For further clarity and understanding of the invention, an explanation of the physical principles involved in the operation of the device may be appropriate. Each of the one or more particles in the container has its center of gravity located at some distance $r$ from the axis of rotation. Whenever the particle or particles are rotated in the circular path provided by the wall of the container at an angular speed $\omega$ such that $\omega^2 r$ is greater than the acceleration of gravity, the particle or particles will continue to move in the circular path. When, however, $\omega^2 r$ becomes less than 1 g. or if, as rotational effect of the particle or particles is generated by the jouncing of the wheel, the speed of the rotation is never great enough so that $\omega^2 r$ is equal to 1 g. then each particle will fall down from some point before reaching the top of its orbit. In so falling, the particle or particles will engage the container at a lower level and the energy of the falling particle or particles will be dissipated on engaging the container in a manner to apply a braking force on the container, thereby resulting in almost immediate stopping of the container rotation.

It is my intention to cover all changes and modifications of the examples of the invention herein chosen for purposes of the disclosure which do not constitute departures from the spirit and scope of the invention.

I claim:

1. A pendulum type odometer comprising a rotating case adapted to be mounted on the axis of rotation of a wheel on a vehicle, a shaft coaxial with said axis and rotating with said case, a pendulous element rotatively supported on said shaft and including a pendulous mass for normally restraining said element from rotation with said shaft, means for recording the relative rotation between said case and said element, a closed annular space around said axis and fixed to said element, and a particulate free mass within said space movable without constraint through 360° within the confines of said space but constrained by the relative size of said mass and said space to confine the center of gravity of said mass to a radial position from said axis which is less than a position at which the centrifugal force acting on said mass equals the force of gravity acting thereon.

2. Apparatus according to claim 1 in which said free mass comprises a plurality of metal balls of diameter greater than that which would produce a centrifugal force on each ball as large as the weight of said ball for the angular velocity of said balls corresponding to the normal maximum angular velocity of said case and a position corresponding to the maximum radial displacement within said space.

3. A pendulum type odometer comprising a rotating case adapted to be mounted on the axis of rotation of a wheel on a vehicle, a shaft coaxial with said axis and rotating with said case, a pendulous element rotatively supported on said shaft and including a pendulous mass for normally restraining said element from rotation with said shaft, means for recording the relative rotation between said case and said element, a closed cylindrical space around said axis and fixed to said element, and a particulate free mass within said space movable without constraint through 360° within the confines of said space but constrained by the relative size of said mass and said space to confine the center of gravity of said mass to a radial position from said axis which is less than a position at which the centrifugal force acting on said mass equals the force of gravity acting thereon.

4. Apparatus according to claim 3 in which the said mass is circular and the diameters of said mass and said space are selected to make the centrifugal force of said mass at the maximum radius of rotation thereof within said space less than the weight of said mass at the upper limit of rotational speed achieved by said case.

5. Apparatus according to claim 4 in which said mass comprises a plurality of loose balls, the diameters of said balls being large enough to maintain the center of gravity of each ball at a radius from said axis less than that which would produce a centrifugal force equal to the weight of an individual ball at the upper limit of rotational speed achieved by said case.

References Cited in the file of this patent

UNITED STATES PATENTS

| | | |
|---|---|---|
| 1,010,654 | Madden | Dec. 5, 1911 |
| 2,310,296 | Knopf | Feb. 9, 1943 |
| 2,375,818 | Peters | May 15, 1945 |
| 2,638,274 | Engler | May 12, 1953 |

FOREIGN PATENTS

| | | |
|---|---|---|
| 10,154 | Great Britain | June 1, 1900 |
| 136,335 | Great Britain | Dec. 18, 1919 |
| 343,819 | Great Britain | Feb. 26, 1931 |
| 335,828 | France | Dec. 18, 1903 |
| 285,118 | Germany | June 21, 1915 |